(12) United States Patent
Komatsu

(10) Patent No.: US 10,862,133 B2
(45) Date of Patent: Dec. 8, 2020

(54) ALUMINUM PLATE AND METHOD FOR MANUFACTURING ALUMINUM PLATE

(71) Applicant: FUJIFILM Corporation, Tokyo (JP)

(72) Inventor: Hiroshi Komatsu, Haibra-gun (JP)

(73) Assignee: FUJIFILM Corporation, Tokyo (JP)

( * ) Notice: Subject to any disclaimer, the term of this patent is extended or adjusted under 35 U.S.C. 154(b) by 579 days.

(21) Appl. No.: 15/483,015

(22) Filed: Apr. 10, 2017

(65) Prior Publication Data

US 2017/0214059 A1    Jul. 27, 2017

Related U.S. Application Data

(63) Continuation of application No. PCT/JP2015/078458, filed on Oct. 7, 2015.

(30) Foreign Application Priority Data

Oct. 14, 2014 (JP) .................. 2014-210093

(51) Int. Cl.
  *H01M 4/80* (2006.01)
  *H01M 4/70* (2006.01)
  (Continued)

(52) U.S. Cl.
  CPC .......... *H01M 4/80* (2013.01); *C23C 18/1651* (2013.01); *C23C 18/34* (2013.01); *C23C 18/36* (2013.01);
  (Continued)

(58) Field of Classification Search
  CPC .......... H01M 4/66; H01M 4/661; H01M 4/70; H01M 4/80; C23C 18/34; C23C 18/36;
  (Continued)

(56) References Cited

U.S. PATENT DOCUMENTS 3,594,134 A * 7/1971 Russell .............. B01D 39/2027
                                                       428/596
5,355,283 A * 10/1994 Marrs ................. H01L 23/3128
                                                       174/260
(Continued)

FOREIGN PATENT DOCUMENTS

CN       102471835 A     5/2012
EP         3202957 A1    8/2017
(Continued)

OTHER PUBLICATIONS

Satoshi et al., WO 2012132999 A1, machine translation, Mar. 19, 2012, entire translation (Year: 2012).*

(Continued)

*Primary Examiner* — Humera N. Sheikh
*Assistant Examiner* — Katherine A Christy
(74) *Attorney, Agent, or Firm* — Sughrue Mion, PLLC

(57) ABSTRACT

An object is to provide an aluminum plate having favorable coating properties and favorable adhesiveness to active materials and a method for manufacturing an aluminum plate. The aluminum plate having a plurality of through holes that penetrate in a thickness direction includes through holes A which have an average opening diameter of the through holes of 0.1 μm or more and less than 100 μm and have a shape in which a maximum diameter Ra is formed inside and the maximum diameter Ra and a minimum diameter Rb satisfy $1 > Rb/Ra \geq 0.1$.

22 Claims, 4 Drawing Sheets

(51) Int. Cl.
*H01M 4/66* (2006.01)
*C25D 11/04* (2006.01)
*C25D 11/02* (2006.01)
*C25D 9/12* (2006.01)
*C25F 3/04* (2006.01)
*C25F 3/14* (2006.01)
*C25D 11/20* (2006.01)
*C23C 18/34* (2006.01)
*C25D 11/24* (2006.01)
*C25D 11/08* (2006.01)
*C23C 18/36* (2006.01)
*C23C 18/16* (2006.01)
*C23C 18/54* (2006.01)
*C25D 3/38* (2006.01)

(52) U.S. Cl.
CPC .............. *C23C 18/54* (2013.01); *C25D 9/12* (2013.01); *C25D 11/08* (2013.01); *C25D 11/20* (2013.01); *C25D 11/24* (2013.01); *C25F 3/04* (2013.01); *C25F 3/14* (2013.01); *H01M 4/66* (2013.01); *H01M 4/661* (2013.01); *H01M 4/70* (2013.01); *C25D 3/38* (2013.01); *C25D 11/024* (2013.01); *C25D 11/04* (2013.01)

(58) Field of Classification Search
CPC .. C23C 18/54; C25D 9/12; C25D 9/20; C25D 9/24; C25F 3/04; C25F 3/14
USPC ........................................................ 428/596
See application file for complete search history.

(56) References Cited

U.S. PATENT DOCUMENTS

| | | | |
|---|---|---|---|
| 5,597,665 A * | 1/1997 | Harada | B22F 3/1103 429/235 |
| 6,099,953 A | 8/2000 | Komai et al. | |
| 6,448,510 B1 * | 9/2002 | Neftin | H01L 21/486 174/256 |
| 2003/0221572 A1 | 12/2003 | Matsuura | |
| 2005/0159281 A1 * | 7/2005 | Nishino | C25D 5/36 492/1 |
| 2012/0256224 A1 * | 10/2012 | Hatanaka | C23C 18/1608 257/98 |

FOREIGN PATENT DOCUMENTS

| | | |
|---|---|---|
| JP | 11-067217 A | 3/1999 |
| JP | 2003-246159 A | 9/2003 |
| JP | 2011-222672 A | 11/2011 |
| WO | 9853499 A1 | 11/1998 |
| WO | 2011/004777 A1 | 1/2011 |
| WO | WO-2012132999 A1 * | 10/2012 ............ H01M 4/525 |

OTHER PUBLICATIONS

First Office Action, dated Apr. 2, 2018, issued in corresponding CN Application No. 201580053980.4, 11 pages in English (partial translation) and Chinese.
Communication dated Jan. 25, 2019 from the Taiwanese Patent Office in application No. 104133367.
International Search Report for PCT/JP2015/078458, dated Nov. 10, 2015.
Communication dated Sep. 8, 2017 from the European Patent Office in counterpart European application No. 15851302.8.
Communication dated Jan. 16, 2018 from the Japanese Patent Office in counterpart Application No. 2016-554050.
International Preliminary Report on Patentability and Translation of Written Opinion issued from the International Bureau in counterpart International Application No. PCT/JP2015/078458, dated Apr. 27, 2017.
Communication dated Apr. 5, 2018, issued by the Korean Intellectual Property Office in corresponding Korean Application No. 10-2017-7010022.
Rejection Decision issued in Taiwanese Application No. 104133367 dated Jan. 17, 2020, 8 pages in English and Chinese.
Communication dated Jun. 10, 2020, from the Taiwanese Intellectual Property Office in application No. 104133367.

* cited by examiner

ALUMINUM PLATE AND METHOD FOR MANUFACTURING ALUMINUM PLATE

CROSS-REFERENCE TO RELATED APPLICATIONS

This application is a Continuation of PCT International Application No. PCT/JP2015/078458 filed on Oct. 7, 2015, which claims priority under 35 U.S.C. § 119(a) to Japanese Patent Application No. 2014-210093 filed on Oct. 14, 2014. The above application is hereby expressly incorporated by reference, in its entirety, into the present application.

BACKGROUND OF THE INVENTION

1. Field of the Invention

The present invention relates to an aluminum plate that is used in collectors for storage devices and a method for manufacturing an aluminum plate.

2. Description of the Related Art

In recent years, in response to the development of portable devices such as personal computers and mobile phones, hybrid vehicles, electric vehicles, and the like, the demand for storage devices, particularly, lithium ion capacitors, lithium ion secondary batteries, and electric double layer capacitors as power supplies has been intensifying.

It is known that, as electrode collectors that are used for positive electrodes or negative electrodes in the above-described storage devices (hereinafter, simply referred to as "the collectors"), aluminum plates are used. In addition, it is known that an active material such as activated charcoal is applied onto the surface of a collector made of this aluminum plate and is used as electrodes such as positive electrodes or negative electrodes.

For example, WO2011/004777A describes the use of an aluminum perforated foil as a collector and describes the application of an active material onto this aluminum perforated foil ("Claim 1" and "0036").

In addition, JP1999-67217A (JP-H11-67217A) describes a hole-opened collector made of a metal foil which is provided with a number of through holes by means of etching and also describes the application of an active material to collectors ("Claim 1" and "0002").

In the above-described collectors, through holes are formed to facilitate the migration of lithium ions, and, when lithium ions are pre-doped, lithium ions diffuse through the through holes and are doped into negative electrodes. Therefore, it is desirable to form a number of through holes in order to efficiently carry out pre-doping.

Here, as a method for forming through holes, forming methods by means of mechanical working such as punching are known. However, through holes formed by means of punching are large holes having a diameter of 300 μm or more. Generally, collectors are thin plate-like members, and thus, when the diameters of through holes are large, the strength of the collector decreases.

In addition, when the diameters of through holes are large, protrusions and recesses corresponding to the through holes in the collector are generated on the surface of the applied active material or the active material bleeds through, and thus the uniformity of the active material surface is impaired, and the coating properties degrade.

Therefore, the formation of fine through holes has been proposed.

For example, WO2011/004777A describes that, when the inner diameters of the through holes are set in a range of 0.2 to 5 μm, the bleed-through of the applied active material is prevented ("0032" and "0036").

SUMMARY OF THE INVENTION

Here, as described in JP1999-67217A (JP-H11-67217A), in a case in which a variety of active materials are applied to an aluminum plate, there is a problem in that the adhesiveness between the aluminum plate and the active materials is weak and the active materials easily drop ("0003"). When the active materials drop after the production of secondary batteries, a problem of a decrease in charge and discharge capacities is caused.

In contrast, JP1999-67217A (JP-H11-67217A) describes that, regarding the shape of the through holes, when the cut angle $\theta_1$ formed by the rear surface of the metal foil and the inner wall surface of the through hole on the rear surface side of the metal foil is set to 10° to 80°, and the cut angle $\theta_2$ formed by the front surface of the metal foil and the inner wall surface of the through hole on the front surface side of the metal foil is set to 90° to 170°, the active materials being applied are easily locked in the through holes, and thus the drop of the active materials is prevented ("0005").

In addition, as a method for forming through holes having a shape in which the inner wall surface is inclined as described above, JP1999-67217A (JP-H11-67217A) discloses a method in which etching is carried out on a three-layer laminate obtained by joining a hole-opened resist film having a number of through holes to the front surface of a hole-free metal foil and joining a hole-free resist film to the rear surface of the hole-free metal foil ("0016").

Here, according to the present inventors' studies, it was found that, at the same opening ratio, as the diameters of through holes decrease, the number of the holes increases, and the total of circumferential lengths of the holes also increases, and thus the diameters of through holes are preferably small from the viewpoint of adhesiveness to active materials.

However, it was found that, even in a case in which through holes are given a smaller diameter and, furthermore, are provided with a shape that expands from one surface toward the other surface as described above, the adhesiveness between active materials and an aluminum plate is not sufficient.

In addition, the opening diameters of the through holes described in JP1999-67217A (JP-H11-67217A) are 0.1 mm to 3 mm, and, in the method described in JP1999-67217A (JP-H11-67217A), it is difficult to form through holes having a smaller diameter and a shape in which the inner wall surface is inclined.

Therefore, an object of the present invention is to provide an aluminum plate having favorable coating properties and favorable adhesiveness to active materials and a method for manufacturing an aluminum plate.

The present inventors carried out intensive studies in order to achieve the above-described object, consequently found that, when an aluminum plate is provided with through holes A which have an average opening diameter of the through holes of 0.1 μm or more and less than 100 μm and have a shape in which the maximum diameter Ra is formed inside and the maximum diameter Ra and the minimum diameter Rb satisfy 1>Rb/Ra≥0.1, it is possible to improve coating properties and enhance adhesiveness to active materials.

That is, it was found that the above-described object can be achieved by means of the following constitutions.

[1] An aluminum plate having a plurality of through holes that penetrate in a thickness direction, comprising: through holes A which have an average opening diameter of the through holes of 0.1 μm or more and less than 100 μm and have a shape in which a maximum diameter Ra is formed inside and the maximum diameter Ra and a minimum diameter Rb satisfy 1>Rb/Ra≥0.1.

[2] The aluminum plate according to [1], in which an angle formed between a main surface of the aluminum plate and an inner wall surface of the through hole A is less than 90°.

[3] The aluminum plate according to [1] or [2], in which the angle formed between the main surface of the aluminum plate and the inner wall surface of the through hole A is 5° to 85°.

[4] The aluminum plate according to any one of [1] to [3], in which the through hole A has the minimum diameter Rb on the main surface of the aluminum plate.

[5] The aluminum plate according to any one of [1] to [4], in which a diameter of the through hole A gradually increases from the main surface of the aluminum plate toward the inside.

[6] The aluminum plate according to any one of [1] to [5], in which a percentage of the through holes A with respect to all through holes is 30% or more.

[7] The aluminum plate according to any one of [1] to [6], in which a thickness of the aluminum plate is 5 μm to 100 μm.

[8] The aluminum plate according to any one of [1] to [7], further comprising recess portions which have an average opening diameter of 0.1 μm to 100 μm and do not penetrate on the main surface of the aluminum plate.

[9] The aluminum plate according to [8], in which a density of the recess portions is 1,000 to 500,000 recess portions/$mm^2$.

[10] The aluminum plate according to [8] or [9], in which a minimum pitch between the recess portions is 0.01 μm to 10 μm.

[11] A method for manufacturing an aluminum plate, including: a coating-forming step of forming an aluminum hydroxide coating including aluminum hydroxide as a main component on a front surface of an aluminum substrate; a through hole-forming step of forming through holes by carrying out a through hole-forming treatment after the coating-forming step; and a coating-removing step of removing the aluminum hydroxide coating after the through hole-forming, step.

[12] The method for manufacturing an aluminum plate according to [11], in which, in the coating-forming, step, the aluminum hydroxide coating is formed by carrying out an electrochemical treatment using nitric acid, hydrochloric acid, sulfuric acid, phosphoric acid, oxalic acid, or a mixed acid of two or more thereof.

[13] The method for manufacturing an aluminum plate according to [11] or [12], in which, in the through hole-forming step, the through holes are formed by carrying out an electrochemical dissolution treatment using nitric acid, hydrochloric acid, sulfuric acid, phosphoric acid, oxalic acid, or a mixed acid of two or more thereof.

[14] The method for manufacturing an aluminum plate according to any one of [11] to [13], in which, in the coating-removing step, the aluminum hydroxide coating is removed by carrying out a chemical dissolution treatment using nitric acid, hydrochloric acid, sulfuric acid, phosphoric acid, oxalic acid, a mixed acid of two or more thereof, or sodium hydroxide.

As described below, according to the present invention, it is possible to provide an aluminum plate having favorable coating properties and favorable adhesiveness to active materials and a method for manufacturing an aluminum plate.

BRIEF DESCRIPTION OF THE DRAWINGS

FIG. 1C is a schematic cross-sectional view illustrating an electrode in which FIG. 1A is used as a collector.

FIGS. 4A to 4E are schematic cross-sectional views for describing an example of a preferred method for manufacturing an aluminum plate of the present invention, in which FIG. 4A is a schematic cross-sectional view of an aluminum substrate, FIG. 4B is a schematic cross-sectional view illustrating a state in which an oxidized film-forming treatment is carried out on the aluminum substrate so as to form an oxidized film, FIG. 4C is a schematic cross-sectional view illustrating a state in which an electrochemical dissolution treatment is carried out after the oxidized film-forming treatment so as to form through holes in the aluminum substrate and the oxidized film, FIG. 4D is a schematic cross-sectional view illustrating a state after the oxidized film is removed following the electrochemical dissolution treatment, and FIG. 4E is a schematic cross-sectional view illustrating a state after an electrochemical roughening treatment is further carried out following the removal of the oxidized film.

FIGS. 5A to 5E are schematic cross-sectional views for describing another example of the preferred method for manufacturing an aluminum plate of the present invention, in which FIG. 5A is a schematic cross-sectional view of an aluminum substrate, FIG. 5B is a schematic cross-sectional view illustrating a state in which the oxidized film-forming treatment is carried out on the aluminum substrate so as to form oxidized films on a front surface and a rear surface, FIG. 5C is a schematic cross-sectional view illustrating a state in which the electrochemical dissolution treatment is carried out after the oxidized film-forming treatment so as to form through holes in the aluminum substrate and the oxidized films, FIG. 5D is a schematic cross-sectional view illustrating a state after the oxidized films are removed following the electrochemical dissolution treatment, and FIG. 5E is a schematic cross-sectional view illustrating a state after the electrochemical roughening treatment is further carried out following the removal of the oxidized films.

DESCRIPTION OF THE PREFERRED EMBODIMENTS

Hereinafter, the present invention will be described in detail.

In the following description, there are cases in which constitutional requirements will be described on the basis of typical embodiments of the present invention, but the present invention is not limited to the above-described embodiments.

Meanwhile, in the present specification, numeric ranges expressed using "to" include numeric values before and after "to" as the lower limit value and the upper limit value.

[Aluminum Plate]

An aluminum plate of the present invention is an aluminum plate having a plurality of through holes that penetrate in a thickness direction, including: through holes A which have an average opening diameter of the through holes of 0.1 μm or more and less than 100 μm and have a shape in which a maximum diameter Ra is formed inside and the maximum diameter Ra and a minimum diameter Rb satisfy 1>Rb/Ra≥0.1.

Next, the constitution of the aluminum plate of the present invention will be described using FIGS. 1A to 1C.

Figure 1A:
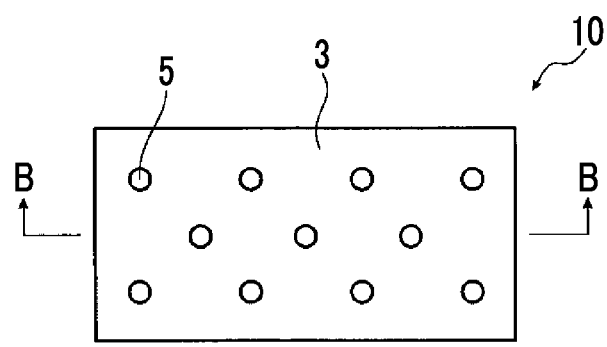
FIG. 1A is a top view schematically illustrating an example of an aluminum plate of the present invention.
Figure 1B:
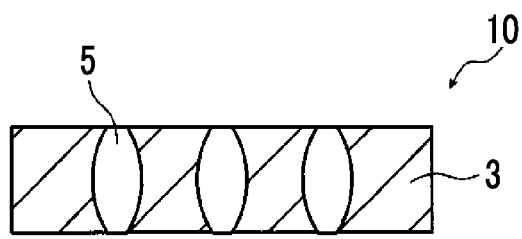
FIG. 1B is a cross-sectional view in a direction of a B-B line in FIG. 1A.
Figure 1C:
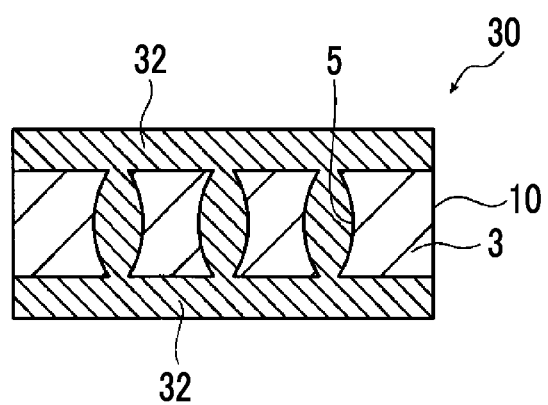

FIG. 1A is a schematic top view illustrating an example of a preferred embodiment of the aluminum plate of the present invention, FIG. 1B is a cross-sectional view in a direction of the B-B line in FIG. 1A, and FIG. 1C is a schematic cross-sectional view illustrating an example of an electrode in which an aluminum plate 10 illustrated in FIG. 1A is used as a collector for storage devices.

As illustrated in FIGS. 1A and 1B, the aluminum plate 10 is obtained by forming a plurality of through holes 5 that penetrate in the thickness direction on an aluminum substrate 3.

In addition, an electrode 30 illustrated in FIG. 1C is obtained by laminating active material layers 32 on both main surfaces of the aluminum plate 10 illustrated in FIG. 1B. As illustrated in the drawings, the active material layer 32 is also loaded into the through holes 5 and is integrated with the active material layers 32 formed on both surfaces.

A plurality of the through holes 5 that are formed in the aluminum substrate 3 include through holes A which have an average opening diameter of 0.1 μm or more and less than 100 μm and have a shape in which the maximum diameter Ra is formed inside and the maximum diameter Ra and the minimum diameter Rb satisfy 1>Rb/Ra≥0.1.

Hereinafter, the shape of the through hole 5 will be described using FIG. 2.

Figure 2:
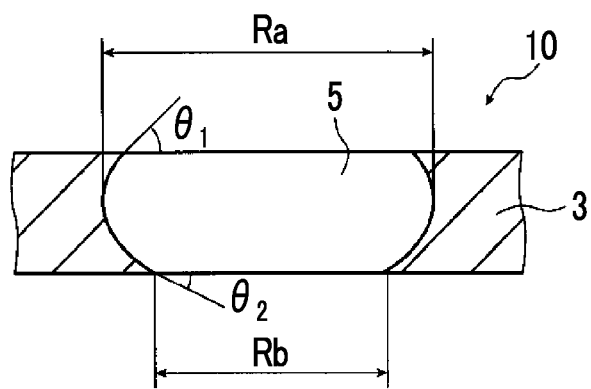
FIG. 2 is a cross-sectional view illustrating a through hole in the aluminum plate illustrated in FIG. 1 in an enlarged manner.

FIG. 2 is a cross-sectional view illustrating the through hole 5 in the aluminum plate 10 illustrated in FIG. 1A in an enlarged manner.

As illustrated in FIG. 2, the through hole 5 has a shape in which, in a cross-sectional view parallel to the axial direction of the through hole 5, the hole diameter gradually increases from both main surfaces of the aluminum substrate 3 toward the inside of the through hole 5 and the maximum diameter Ra is formed inside the through hole 5. Therefore, the through hole 5 have the minimum diameter Rb on one main surface side of the aluminum substrate 3.

In addition, the ratio Rb/Ra between the maximum diameter Ra and the minimum diameter Rb in one through hole 5 satisfies 1>Rb/Ra≥0.1.

In addition, in the through hole 5 illustrated in the drawing, the angles $\theta_1$ and $\theta_2$ formed between the main surface of the aluminum substrate 3 and the inner wall surface of the through hole 5 are both less than 90°.

This through hole 5 is a through hole A in the present invention.

As described above, in order to improve the coating properties of active materials being applied to aluminum plates, it was necessary to form through holes to be fine.

Meanwhile, in a case in which an active material is applied to an aluminum plate, there is a problem in that the adhesiveness between the aluminum plate and the active material weakens, and particularly, in a case in which the through holes are formed to be fine, there is a problem in that the adhesiveness between the aluminum plate and the active material weakens and the active material is likely to drop.

In contrast, the present invention has the through holes A which have an average opening diameter of the through holes of 0.1 μm or more and less than 100 μm and have a shape in which the maximum diameter Ra is formed inside and the maximum diameter Ra and the minimum diameter Rb satisfy 1>Rb/Ra≥0.1.

Since the average opening diameter of the through holes is small, it is possible to prevent the generation of protrusions and recesses corresponding to the through holes on the surface of the applied active material or the bleed-off of the active material and uniformly apply active materials. In addition, since the aluminum plate includes the through holes A having the shape in which the maximum diameter Ra is formed inside and the maximum diameter Ra and the minimum diameter Rb satisfy 1>Rb/Ra≥0.1, as illustrated in FIG. 1C, the active material loaded into the inside of the through holes is locked in the through holes, and thus the adhesiveness between the active material and the aluminum plate enhances, and the drop of the active material can be prevented. Therefore, it is possible to prevent a decrease in charge and discharge capacities caused by the drop of the active material.

Here, in the example illustrated in the drawings, the angles $\theta_1$ and $\theta_2$ formed between the inner wall surface of the through hole A and the main surface of the aluminum plate are set to less than 90°, but are not limited thereto, and the angles $\theta_1$ and $\theta_2$ may be 90° or more. However, when the angles $\theta_1$ and $\theta_2$ are set to less than 90°, the active material is more preferably locked in the through holes, and the drop of the active material can be prevented. On the other hand, when the angles $\theta_1$ and $\theta_2$ are set to be too acute, there is a concern that productivity may degrade.

Therefore, the angles $\theta_1$ and $\theta_2$ are preferably less than 90°, more preferably 5° to 85°, and particularly preferably 35° to 55° from the viewpoint of adhesiveness to active materials, productivity, costs, the strength of aluminum plates, and the like.

Meanwhile, the angles $\theta_1$ and $\theta_2$ may be angles different from each other or may be the same angle.

In addition, in the example illustrated in the drawings, the through hole A has a shape in which the minimum diameter Rb is formed on the main surface of the aluminum plate, but the shape is not limited thereto, and the through hole may have a shape in which the minimum diameter Rb is formed inside the through hole A. However, when the through hole is given a shape in which the minimum diameter Rb is formed on the main surface, the active material is more preferably locked in the through holes, and thus the drop of the active material can be prevented.

Therefore, the through hole is preferably given a shape in which the minimum diameter Rb is formed on at least one main surface of the aluminum plate from the viewpoint of adhesiveness to active materials, productivity, and the like.

In addition, in the example illustrated in the drawings, the through hole A is given a shape in which the hole diameter gradually increases from both main surfaces of the aluminum substrate 3 toward the inside of the through hole 5, but the shape is not limited thereto, and the through hole may have, for example, a shape in which the hole diameter decreases first and then increases toward the inside.

However, the through hole A is preferably given a shape in which the hole diameter gradually increases from both main surfaces of the aluminum substrate 3 toward the inside of the through hole 5 from the viewpoint of adhesiveness to active materials, productivity, and the like.

In addition, as the ratio of the minimum diameter Rb to the maximum diameter Ra decreases, that is, as the difference between the maximum diameter Ra and the minimum diameter Rb increases, the active material is more preferably locked in the through holes, and the drop of the active material can be prevented. On the other hand, when the difference between the maximum diameter Ra and the minimum diameter Rb is too large, there is a concern that productivity may degrade.

Therefore, the ratio Rb/Ra between the maximum diameter Ra and the minimum diameter Rb is preferably 0.8≥Rb/Ra≥0.1 and more preferably 0.7≥Rb/Ra≥0.2 from the viewpoint of adhesiveness to active materials, productivity, costs, the strength of aluminum plates, and the like.

In addition, the average opening diameter of the through holes is preferably more than 5 μm and 80 μm or less, more preferably more than 5 μm and 40 μm or less, and particularly preferably 10 μm to 30 μm from the viewpoint of the coating properties of active materials, adhesiveness to active materials, tensile strength, and the like.

Meanwhile, the average opening diameter of the through holes is obtained by capturing an image of the surface of the aluminum plate using a high-resolution scanning electron microscope (SEM) at a magnification of 200 times from one surface of the aluminum plate, extracting at least 20 through holes having a circumference that continues in a ring shape from the obtained SEM image, scanning the opening diameters, and computing the average value thereof as the average opening diameter.

Meanwhile, the maximum value of the distance between the end portions of the through hole portion was measured as the opening diameter. That is, since the shape of the opening portion of the through hole is not limited to a substantial circle shape, in a case in which the shape of the opening portion is not a circle shape, the maximum value of the distances between the end portions of the through hole portion is considered as the opening diameter. Therefore, for example, in the case of a through hole having a shape in which two or more through holes are integrated together, this through hole is considered as one through hole, and the maximum value of the distances between the end portions of the through hole portion is considered as the opening diameter.

In addition, the shape of the through hole is a shape seen on a cross-sectional surface in a direction in which the maximum value of the opening diameter is measured during measurement, and, regarding the maximum diameter Ra and the minimum diameter Rb, the Rb/Ra's are computed by cutting the through hole using a microtome so as to form a cross section, capturing an image of this cross section using a high-resolution scanning electron microscope (SEM) at a magnification of 800 times, extracting 10 through holes A having a shape in which the maximum diameter is formed inside, and measuring the maximum diameters Ra and the minimum diameters Rb.

In addition, the percentage of the number of the through holes A having the above-described shape with respect to all through holes is not particularly limited, but is preferably 30% or more, more preferably 30% to 90%, and particularly preferably 40% to 70% from the viewpoint of adhesiveness to active materials, productivity, costs, the strength of aluminum plates, and the like.

Meanwhile, the percentage of the through holes A is obtained by computing the percentage of the number of the through holes A with respect to all through holes in ten 5 mm×5 mm-ranged places by means of the same measurement as the measurement of the average opening diameter and the measurement of the shape of the through hole.

In addition, the average opening ratio of the aluminum plate is not particularly limited, but is preferably 1% to 40%, more preferably 5% to 30%, and particularly preferably 5% to 25% from the viewpoint of coating properties, adhesiveness, tensile strength, and the like.

Meanwhile, the average opening ratio is obtained by capturing an image of the surface of the aluminum plate from right above using a high-resolution scanning electron microscope (SEM) at a magnification of 200 times, binarizing (five) 30 mm×30 mm visual fields in the obtained SEM image using image analysis software or the like so as to observe through hole portions and non-through hole portions, computing the ratio (the opening area/the geometric area) from the total opening area of the through holes and the area of the visual fields (the geometric area), and computing the average value of those at the respective visual fields (five places) as the average opening ratio.

Here, the aluminum plate of the present invention may have non-penetrated holes, that is, recess portions having an average opening diameter of 0.1 μm to 100 μm since the adhesiveness to the active material layers becomes more favorable.

When the aluminum plate has the recess portions, the surface area increases, and the area of the aluminum plate adhered to the active material layers increases, and thus adhesiveness further improves.

Here, the average opening diameter of the recess portions is obtained by capturing an image of the surface of the aluminum plate from right above using a high-resolution scanning electron microscope (SEM) at a magnification of 2,000 times, extracting at least 30 recess portions (pits) having an uneven structure the circumference of which continues in a ring shape from the obtained SEM image, scanning the maximum diameters as the opening diameters, and computing the average value thereof as the average opening ratio. Meanwhile, the maximum diameter refers to the maximum value of the linear distances between one edge and the other edge of the opening portion of the recess portion, and is, for example, a diameter in a case in which the recess portion has a circular shape, a long diameter in a case in which the recess portion has an elliptical shape, and the maximum value of the linear distances between the edge of one ring and the edge of another ring in a case in which the recess portion has a shape in which a plurality of rings overlap together.

Meanwhile, from the viewpoint of adhesiveness, the average opening diameter of the recess portions is preferably 0.1 μm to 100 μm and more preferably 1 μm to 50 μm.

In addition, from the viewpoint of adhesiveness, the density of the recess portions is preferably 1,000 recess portions/mm$^2$ to 500,000 recess portions/mm$^2$ and more preferably 5,000 recess portions/mm$^2$ to 300,000 recess portions/mm$^2$.

In addition, from the viewpoint of adhesiveness, the minimum pitch between the recess portions is preferably 0.01 μm to 10 μm and more preferably 0.05 μm to 5 μm.

In addition, in the example illustrated in FIG. 1B, a plurality of the through holes 5 are formed in the aluminum substrate 3, but the present invention is not limited thereto, and the aluminum plate may also have a metal layer made of a metal plate covering at least the inner surfaces of the through holes.

Figure 3:
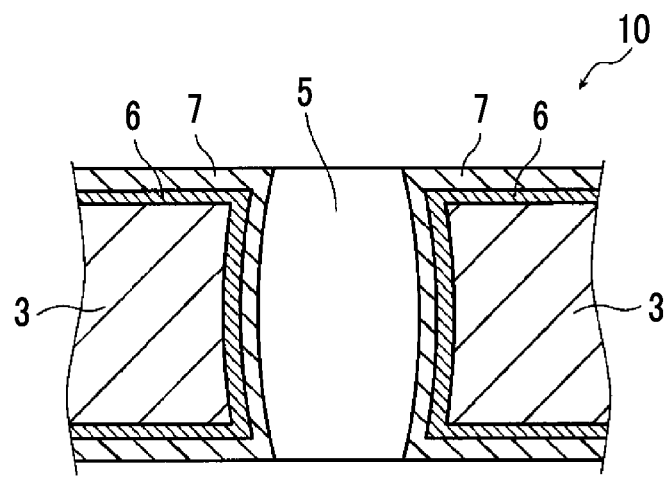
FIG. 3 is a schematic cross-sectional view illustrating another example of the aluminum plate of the present invention.

FIG. 3 is a schematic cross-sectional view illustrating another example of the aluminum plate of the present invention.

The aluminum plate 10 illustrated in FIG. 3 has a first metal layer 6 and a second metal layer 7, which are made of metal other than aluminum or an alloy, on the front surface and rear surface of the aluminum substrate 3 having the through holes and the inner surfaces (inner walls) of the through holes 5.

As described above, when the metal layer is formed on the inner surfaces of the through holes, it is possible to preferably adjust the average opening diameter of the through holes in a narrow range of approximately 0.1 µm to 20 µm.

The above-described metal layer can be formed by means of a metal coating step described below.

Meanwhile, in the example illustrated in the drawing, the metal layer is formed on the front surface and rear surface of the aluminum substrate 3 and the inner surfaces of the through holes 5, but the constitution is not limited thereto, and the metal layer may be only formed on at least the inner surfaces of the through holes 5.

<Aluminum Substrate>

The aluminum substrate is not particularly limited, and it is possible to use well-known aluminum substrates, for example, alloy Nos. 1085, 1N30, 3003, and the like described in JIS Standards H4000. Meanwhile, the aluminum substrate is an alloy plate including aluminum as a main component and a small amount of foreign elements.

The thickness of the aluminum substrate is not particularly limited, but is preferably 5 µm to 1,000 µm, more preferably 10 µm to 100 µm, and particularly preferably 5 µm to 30 µm.

<Active Material Layer>

The active material layer is not particularly limited, and it is possible to use well-known active material layers that are used in storage devices of the related art.

Specifically, regarding conductive materials, binders, solvents, and the like which the active material and the active material layer may include in a case in which the aluminum plate is used as a collector for positive electrodes, it is possible to appropriately employ materials described in Paragraphs "0077" to "0088" of JP2012-216513A, the content of which is incorporated into the present specification by reference.

In addition, regarding active materials in a case in which the aluminum plate is used as a collector for negative electrodes, it is possible to appropriately employ materials described in Paragraph "0089" of JP2012-216513A, the content of which is incorporated into the present specification by reference.

[Storage Device]

Electrodes in which the aluminum plate of the present invention is used as a collector can be used as positive electrodes or negative electrodes in storage devices.

Here, regarding the specific constitution or applications of storage devices (particularly, secondary batteries), it is possible to appropriately employ materials or applications described in Paragraphs "0090" to "0123" of JP2012-216513A, the content of which is incorporated into the present specification by reference.

In addition, in the example illustrated in FIG. 1C, the aluminum plate of the present invention is used as a collector, but the aluminum plate of the present invention can also be used in other applications. For example, the aluminum plate can be preferably used in heat-resistant fine particle filters, acoustic absorption materials, and the like.

[Method for Manufacturing Aluminum Plate]

Next, a method for manufacturing an aluminum plate of the present invention will be described.

The method for manufacturing an aluminum plate is a method for manufacturing an aluminum plate having an aluminum substrate having a plurality of through holes that penetrate in the thickness direction, including a coating-forming step of forming a coating including aluminum hydroxide as a main component on the front surface of the aluminum substrate, a through hole-forming step of forming through holes by carrying out a through hole-forming treatment after the coating-forming step; and a coating-removing step of removing the aluminum hydroxide coating after the through hole-forming step.

In the present invention, since the coating-forming step, the through hole-forming step, and the coating-removing step are provided, it is possible to form the through holes A which have an average opening diameter of 0.1 µm or more and less than 100 µm and have a shape in which the maximum diameter Ra is formed inside and the maximum diameter Ra and a minimum diameter Rb satisfy $1 > Rb/Ra \geq 0.1$, and thus it is possible to manufacture aluminum plates which have excellent coating properties of active materials and excellent adhesiveness between active materials and the aluminum plates and can be preferably used in collectors.

Next, the respective steps of the method for manufacturing an aluminum plate will be described using FIGS. 4A to 4E and FIGS. 5A to 5E, and then the respective steps will be described in detail.

FIGS. 4A to 4E and FIGS. 5A to 5E are schematic cross-sectional views illustrating examples of a preferred embodiment of the method for manufacturing an aluminum plate.

The method for manufacturing an aluminum plate is, as illustrated in FIGS. 4A to 4E and FIGS. 5A to 5E, a manufacturing method including a coating-forming step (FIG. 4A and FIG. 4B and FIG. 5A and FIG. 5B) of forming an aluminum hydroxide coating 2 by carrying out a coating-forming treatment on one main surface (both main surfaces in the aspect illustrated in FIGS. 5A to 5E) of an aluminum substrate 1, a through hole-forming step (FIG. 4B and FIG. 4C and FIG. 5B and FIG. 5C) of forming the through holes 5 by carrying out an electrolytic dissolution treatment after the coating-forming step, thereby producing an aluminum plate having an aluminum substrate 3 having the through holes and an aluminum hydroxide coating 4 having the through holes, and a coating-removing step (FIG. 4C and FIG. 4D and FIG. 5C and FIG. 5D) of removing the aluminum hydroxide coating 4 having the through holes after the through hole-forming step, thereby producing the aluminum plate 10 made of the aluminum substrate 3 having the through holes.

In addition, the method for manufacturing an aluminum plate preferably has a roughening treatment step (FIG. 4D and FIG. 4E and FIG. 5D and FIG. 5E) of carrying out an electrochemical roughening treatment on the aluminum substrate 3 having the through holes after the coating-removing step, thereby producing the aluminum plate 10 having a roughened surface.

In the electrolytic dissolution treatment for forming the through holes, the aluminum hydroxide coating has higher reflectivity than the aluminum substrate. Therefore, a large amount of current is diffused in the inside region than in regions in contact with the aluminum hydroxide coating, and through holes formed in the aluminum substrate by means of the electrolytic dissolution treatment are formed to have a shape in which the maximum diameter Ra is formed inside.

Therefore, when through holes are formed by carrying out the electrolytic dissolution treatment in the through hole-forming step after the coating-forming step of forming the aluminum hydroxide coating, it is possible to form through holes which have an average opening diameter of 0.1 μm or more and less than 100 μm and have a shape in which the maximum diameter Ra is formed inside and the maximum diameter Ra and the minimum diameter Rb satisfy 1>Rb/Ra≥0.1.

Here, small holes are easily formed in the aluminum hydroxide coating, and thus, in the through hole-forming step, non-penetrated holes that do not penetrate the aluminum substrate are likely to be generated. That is, it is possible to easily form the above-described 0.1 μm to 10 μm recess portions.

[Coating-Forming Step]

In the present invention, the coating-forming step in the method for manufacturing an aluminum plate is a step of forming an aluminum hydroxide coating by carrying out a coating-forming treatment on the surface of the aluminum substrate.

<Coating-Forming Treatment>

The above-described coating-forming treatment is not particularly limited, and it is possible to carry out, for example, the same treatment as well-known aluminum hydroxide coating-forming treatments of the related art.

As the coating-forming treatment, it is possible to appropriately employ, for example, conditions or devices described in Paragraphs "0013" to "0026" of JP2011-201123A.

In the present invention, the conditions of the coating-forming treatment vary in diverse manners depending on electrolytic solutions being used and thus cannot be determined uniformly; however, generally, the concentration of an electrolytic solution in a range of 1% to 80% by mass, the liquid temperature in a range of 5° C. to 70° C., the current density in a range of 0.5 to 60 A/dm$^2$, the voltage in a range of 1 to 100 V, and the electrolysis duration in a range of 1 second to 20 minutes are appropriate and are adjusted so as to obtain a desired amount of a coating.

In the present invention, an electrochemical treatment is preferably carried out using nitric acid, hydrochloric acid, sulfuric acid, phosphoric acid, oxalic acid, or a mixed acid of two or more of these acids as an electrolytic solution.

In a case in which the electrochemical treatment is carried out in an electrolytic solution containing nitric acid and hydrochloric acid, direct current or alternating current may be applied between the aluminum substrate and a counter electrode. In a case in which direct current is applied to the aluminum substrate, the current density is preferably 1 to 60 A/dm$^2$ and more preferably in a range of 5 to 50 A/dm$^2$. In a case in which the electrochemical treatment is carried out continuously, the anodization is preferably carried out using a liquid power feeding method in which power is fed to the aluminum substrate through an electrolytic solution.

In the present invention, the amount of the aluminum hydroxide coating being formed by means of the coating-forming treatment is preferably in a range of 0.05 to 50 g/m$^2$ and more preferably in a range of 0.1 to 10 g/m$^2$.

[Through Hole-Forming Step]

The through hole-forming step is a step in which an electrolytic dissolution treatment is carried out after the coating-forming step, thereby forming through holes.

<Electrolytic Dissolution Treatment>

The above-described electrolytic dissolution treatment is not particularly limited, and it is possible to use direct current or alternating current and use an acidic solution as an electrolytic solution. Among acidic solutions, the electrochemical treatment is preferably carried out using at least one acid of nitric acid or hydrochloric acid, and the electrochemical treatment is more preferably carried out using a mixed acid of at least one of sulfuric acid, phosphoric acid, or oxalic acid in addition to the above-described acids.

In the present invention, as the acidic solution which is the electrolytic solution, it is possible to use, in addition to the above-described acids, electrolytic solutions described in the respective specifications of U.S. Pat. Nos. 4,671,859A, 4,661,219A, 4,618,405A, 4,600,482A, 4,566,960A, 4,566,958A, 4,566,959A, 4,416,972A, 4,374,710A, 4,336,113A, and 4,184,932A.

The concentration of the acidic solution is preferably in a range of 0.1% by mass to 2.5% by mass and more preferably in a range of 0.2% by mass to 2.0% by mass. In addition, the liquid temperature of the acidic solution is preferably in a range of 20° C. to 80° C. and more preferably in a range of 30° C. to 60° C.

In addition, as an aqueous solution including the above-described acid as a main body, it is possible to use an aqueous solution obtained by adding at least one of a nitric acid compound having nitric acid ions such as aluminum nitrate, sodium nitrate, or ammonium nitrate, a hydrochloric acid compound having hydrochloric acid ions such as aluminum chloride, sodium chloride, or ammonium chloride, or a sulfuric acid compound having sulfuric acid ions such as aluminum sulfate, sodium sulfate, or ammonium sulfate to an aqueous solution of an acid which has a concentration of 1 to 100 g/L in a range of 1 g/L to saturation.

In addition, the aqueous solution including the above-described acid as the main body may contain metals which are included in an aluminum alloy such as iron, copper, manganese, nickel, titanium, magnesium, and silica. A liquid obtained by adding aluminum chloride, aluminum nitrate, aluminum sulfate, or the like to an aqueous solution of an acid having a concentration in a range of 0.1% by mass to 2% by mass so that the concentration of aluminum ions falls in a range of 1 g/L to 100 g/L is preferably used.

In the electrochemical dissolution treatment, direct current is mainly used; however, in a case in which alternating current is used, the alternating-current power source wave is not particularly limited, and a sine wave, a square wave, a trapezoidal wave, a triangular wave, and the like can be used, and, among these, a square wave or a trapezoidal wave is preferred, and a trapezoidal wave is particularly preferred.

(Nitric Acid Electrolysis)

In the present invention, it is possible to easily form through holes which have an average opening diameter in a range of 0.1 μm or more and less than 100 μm and reaches the maximum diameter Ra inside by means of an electrochemical dissolution treatment in which an electrolytic solution including nitric acid as a main body is used (hereinafter, also abbreviated as "the nitric acid dissolution treatment").

Here, the nitric acid dissolution treatment is preferably an electrolytic treatment which is carried out using direct current under conditions of an average current density set to 5 A/dm$^2$ or higher and a quantity of electricity set to 50 C/dm$^2$ or greater since it is easy to control dissolution points of through hole formation. Meanwhile, the average current density is preferably 100 A/dm$^2$ or lower, and the quantity of electricity is preferably 10,000 C/dm$^2$ or less.

In addition, the concentration or temperature of the electrolytic solution in the nitric acid electrolysis is not particularly limited, and it is possible to carry out electrolysis using a nitric acid electrolytic solution having a high concentration, for example, a nitric acid concentration in a range of 15% by mass to 35% by mass at 30° C. to 60° C. or carry out electrolysis using a nitric acid electrolytic solution having a nitric acid concentration in a range of 0.7% by mass to 2% by mass at a high temperature, for example, at 80° C. or higher.

In addition, it is possible to carry out electrolysis using an electrolytic solution obtained by mixing at least one of sulfuric acid, oxalic acid, and phosphoric acid having a concentration of 0.1% to 50% by mass into the above-described nitric acid electrolytic solution.

(Hydrochloric Acid Electrolysis)

In the present invention, it is also possible to easily form through holes which have an average opening diameter in a range of 1 μm or more and less than 100 μm and reaches the maximum diameter Ra inside by means of an electrochemical dissolution treatment in which an electrolytic solution including hydrochloric acid as a main body is used (hereinafter, also abbreviated as "the hydrochloric acid dissolution treatment").

Here, the hydrochloric acid dissolution treatment is preferably an electrolytic treatment which is carried out using direct current under conditions of an average current density set to 5 A/dm$^2$ or higher and a quantity of electricity set to 50 C/dm$^2$ or greater since it is easy to control dissolution points of through hole formation. Meanwhile, the average current density is preferably 100 A/dm$^2$ or lower, and the quantity of electricity is preferably 10,000 C/dm$^2$ or less.

In addition, the hydrochloric acid concentration or temperature of the electrolytic solution is not particularly limited, and it is possible to carry out electrolysis using a hydrochloric acid electrolytic solution having a high concentration, for example, a hydrochloric acid concentration in a range of 10% by mass to 35% by mass at 30° C. to 60° C. or carry out electrolysis using a hydrochloric acid electrolytic solution having a hydrochloric acid concentration in a range of 0.7% by mass to 2% by mass at a high temperature, for example, at 80° C. or higher.

In addition, it is possible to carry out electrolysis using an electrolytic solution obtained by mixing at least one of sulfuric acid, oxalic acid, and phosphoric acid having a concentration of 0.1% to 50% by mass into the above-described hydrochloric acid electrolytic solution.

[Coating-Removing Step]

The coating-removing step is a step of removing the aluminum hydroxide coating by carrying out a chemical dissolution treatment.

The coating-removing step is capable of removing the aluminum hydroxide coating by, for example, carrying out an acid etching treatment or an alkali etching treatment described below.

<Acid Etching Treatment>

The above-described dissolution treatment is a treatment in which the aluminum hydroxide coating is dissolved using a solution that dissolves aluminum hydroxide earlier than aluminum (hereinafter, referred to as "the aluminum hydroxide dissolution liquid").

Here, the aluminum hydroxide dissolution liquid is preferably an aqueous solution including at least one selected from a group consisting of, for example, nitric acid, hydrochloric acid, sulfuric acid, phosphoric acid, oxalic acid, chromium compounds, zirconium-based compounds, titanium-based compounds, lithium salts, cerium salts, magnesium salts, sodium silicofluoride, zinc fluoride, manganese compounds, molybdenum compounds, magnesium compounds, barium compounds, and halogen single bodies.

Specific examples of the chromium compounds include chromium (III) oxide, anhydrous chromium (VI) acid, and the like.

Examples of the zirconium-based compounds include ammonium fluorozirconate, zirconium fluoride, and zirconium chloride.

Examples of the titanium-based compounds include titanium oxide and titanium sulfide.

Examples of the lithium salts include lithium fluoride and lithium chloride.

Examples of the cerium salts include cerium fluoride and cerium chloride.

Examples of the magnesium salts include magnesium sulfide.

Examples of the manganese compounds include sodium permanganate and calcium permanganate.

Examples of the molybdenum compounds include sodium molybdate.

Examples of the magnesium compounds include magnesium fluoride•pentahydrate.

Examples of the barium compounds include barium oxide, barium acetate, barium carbonate, barium chlorate, barium chloride, barium fluoride, barium iodide, barium lactate, barium oxalate, barium perchlorate, barium selenate, barium selenite, barium stearate, barium sulfite, barium titanate, barium hydroxide, barium nitrate, hydrates thereof, and the like.

Among the above-described barium compounds, barium oxide, barium acetate, and barium carbonate are preferred, and barium oxide is particularly preferred.

Examples of the halogen single bodies include chlorine, fluorine, and bromine.

Among these, the aluminum hydroxide dissolution liquid is preferably an aqueous solution containing an acid, examples of the acid include nitric acid, hydrochloric acid, sulfuric acid, phosphoric acid, oxalic acid, and the like, and the acid may be a mixture of two or more acids.

The concentration of the acid is preferably 0.01 mol/L or higher, more preferably 0.05 mol/L or higher, and still more preferably 0.1 mol/L or higher. There is no particular upper limit, and the upper limit is generally 10 mol/L or lower and more preferably 5 mol/L or lower.

The dissolution treatment is carried out by bringing the aluminum substrate on which the aluminum hydroxide coating is formed into contact with the above-described dissolution liquid. A method for bringing the aluminum substrate into contact with the alumina dissolution liquid is not particularly limited, and examples thereof include a dipping method and a spraying method. Among these, the dipping method is preferred.

The dipping method is a treatment in which the aluminum substrate on which the aluminum hydroxide coating is formed is dipped into the above-described dissolution liquid. During the dipping treatment, it is preferable to carry out stirring since the treatment is carried out evenly.

The duration of the dipping treatment is preferably 10 minutes or longer, more preferably one hour or longer, and still more preferably three hours or longer and five hours or longer.

<Alkali Etching Treatment>

The alkali etching treatment is a treatment in which the surface layer is dissolved by bringing the aluminum hydroxide coating into contact with an alkali solution.

Examples of alkalis that can be used in the alkali solution include caustic alkalis and alkali metal salts. Specific examples of caustic alkalis include sodium hydroxide (caustic soda) and caustic potash. In addition, examples of alkali metal salts include alkali metal silicates such as sodium metasilicate, sodium silicate, potassium metasilicate, and potassium silicate; alkali metal carbonates such as sodium carbonate and potassium carbonate; alkali metal aluminate such as sodium aluminate and potassium aluminate; alkali metal aldonates such as sodium gluconate and potassium gluconate; and alkali metal hydrogenphosphate such as sodium diphosphate, potassium diphosphate, sodium triphosphate, and potassium triphosphate. Among these, solutions of caustic alkalis and solutions containing both caustic alkali and alkali metal aluminate are preferred from the viewpoint of the fast etching rates and the cheap prices. Particularly, an aqueous solution of sodium hydroxide is preferred.

The concentration of the alkali solution is preferably in a range of 0.1% by mass to 50% by mass and more preferably in a range of 0.2% by mass to 10% by mass. In a case in which the alkali solution has aluminum ions dissolved therein, the concentration of aluminum ions is preferably in a range of 0.01% by mass to 10% by mass and more preferably in a range of 0.1% by mass to 3% by mass. The temperature of the alkali solution is preferably in a range of 10° C. to 90° C. The treatment duration is preferably in a range of 1 second to 120 seconds.

Examples of a method for bringing the aluminum hydroxide coating into contact with the alkali solution include a method in which the aluminum substrate on which the aluminum hydroxide coating is formed is passed through a tank including the alkali solution, a method in which the aluminum substrate on which the aluminum hydroxide coating is formed is immersed in a tank including the alkali solution, and a method in which the alkali solution is sprayed to the surface (the aluminum hydroxide coating) of the aluminum substrate on which the aluminum hydroxide coating is formed.

[Roughening Treatment Step]

In the present invention, the arbitrary roughening treatment step which the method for manufacturing an aluminum plate may have is a step of roughening the front surface or the rear surface of the aluminum substrate by carrying out an electrochemical roughening treatment (hereinafter, also abbreviated as "the electrolytic roughening treatment") on the aluminum substrate from which the aluminum hydroxide coating is removed.

When the electrolytic roughening treatment is carried out and the surface of the aluminum substrate is roughened as described above, adhesiveness to layers including active material improves, and an increase in the surface area leads to an increase in the contact area, and thus the capacity maintenance rate of storage devices in which aluminum plates (collectors) obtained using the manufacturing method of the present invention are used enhance.

In the electrolytic roughening treatment, it is possible to appropriately employ, for example, conditions or devices described in Paragraphs "0041" to "0050" of JP2012-216513A.

As described above, in the manufacturing method of the present invention, after the formation of the aluminum hydroxide coating, the recess portions are also formed during the formation of the through holes, and furthermore, the recess portions can be densely formed by carrying out the roughening treatment.

In addition, in the above-described embodiment, a constitution in which the roughening treatment is carried out after the formation of the through holes is provided, but the constitution is not limited thereto, and a constitution in which the through holes are formed after the roughening treatment may be provided.

<Nitric Acid Electrolysis>

In the present invention, it is possible to easily form recessed portions having an average opening diameter in a range of 0.5 μm to 3.0 μm at a density of 10 recess portions/100 μm$^2$ or higher by means of an electrochemical roughening treatment in which an electrolytic solution including nitric acid as a main body is used (hereinafter, also abbreviated as "the nitric acid electrolysis").

Here, the nitric acid electrolysis is preferably an electrolytic treatment which is carried out using alternating current under conditions of a peak current density set to 30 A/dm$^2$ or higher, an average current density set to 13 A/dm$^2$ or higher, and a quantity of electricity set to 150 C/dm$^2$ or greater since it becomes possible to form uniform recessed portions at a high density. Meanwhile, the peak current density is preferably 100 A/dm$^2$ or lower, the average current density is preferably 40 A/dm$^2$ or lower, and the quantity of electricity is preferably 400 C/dm$^2$ or less.

In addition, the concentration or temperature of the electrolytic solution in the nitric acid electrolysis is not particularly limited, and it is possible to carry out electrolysis using a nitric acid electrolytic solution having a high concentration, for example, a nitric acid concentration in a range of 15% by mass to 35% by mass at 30° C. to 60° C. or carry out electrolysis using a nitric acid electrolytic solution having a nitric acid concentration in a range of 0.7% by mass to 2% by mass at a high temperature, for example, at 80° C. or higher.

<Hydrochloric Acid Electrolysis>

In the present invention, it is possible to form recessed portions having an average opening diameter in a range of 0.5 μm to 3.0 μm at a density of 10 recess portions/100 μm$^2$ or higher by means of an electrochemical roughening treatment in which an electrolytic solution including hydrochloric acid as a main body is used (hereinafter, also abbreviated as "the hydrochloric acid electrolysis").

Here, the hydrochloric acid electrolysis is preferably an electrolytic treatment which is carried out using alternating current under conditions of a peak current density set to 30 A/dm$^2$ or higher, an average current density set to 13 A/dm$^2$ or higher, and a quantity of electricity set to 150 C/dm$^2$ or greater since it becomes possible to form uniform recessed portions at a high density. Meanwhile, the peak current density is preferably 100 A/dm$^2$ or lower, the average current density is preferably 40 A/dm$^2$ or lower, and the quantity of electricity is preferably 400 C/dm$^2$ or less.

[Metal Coating Step]

In the present invention, the method for manufacturing an aluminum plate preferably has a metal coating step in which part or all of the surfaces of the aluminum substrate including at least the inner walls of the through holes are coated with a metal other than aluminum after the above-described coating-removing step since it is possible to adjust the average opening diameter of the through holes formed by means of the above-described electrolytic dissolution treatment to be small in a range of approximately 0.1 μm to 20 μm.

Here, "part or all of the surfaces of the aluminum substrate including at least the inner walls of the through holes are coated with a metal other than aluminum" means that, out of all the surfaces of the aluminum substrate including the inner walls of the through holes, at least the inner walls of the through holes are coated, and the surfaces other than the inner walls may not be coated or may be wholly or partially coated.

Hereinafter, the metal coating step will be described using FIG. 3.

Figure 4A:
Figure 4B:
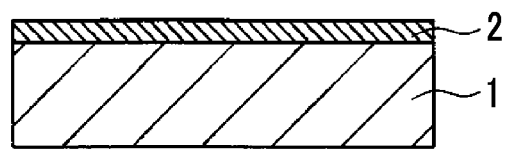
Figure 4C:
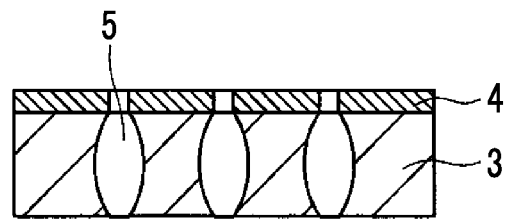
Figure 4D:
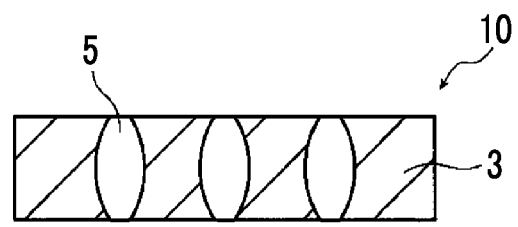
Figure 4E:
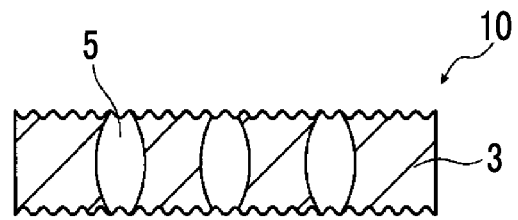
Figure 5A:
Figure 5B:
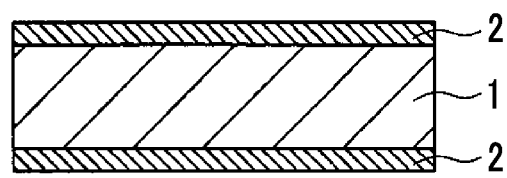
Figure 5C:
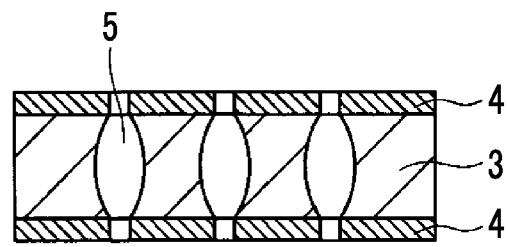
Figure 5D:
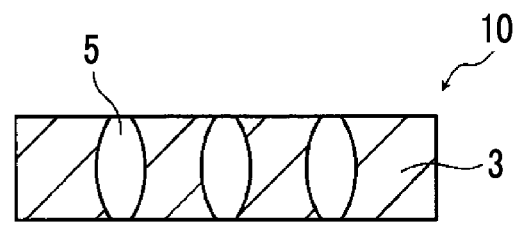
Figure 5E:
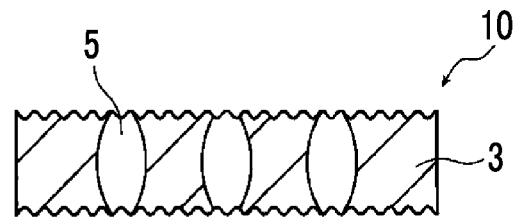

As described above, the aluminum plate 10 illustrated in FIG. 3 is an aspect in which first metal layers 6 and second metal layers 7 which are made of metals other than aluminum or alloys are provided on the front surface and the rear surface of the aluminum substrate 3 having the through holes and the inner walls of the through holes and can be produced by carrying out, for example, a substitution treatment and a plating treatment, which will be described below, on the aluminum substrate illustrated in FIG. 4D or 5D.

<Substitution Treatment>

The substitution treatment is a treatment in which part or all of the surfaces of the aluminum substrate including at least the inner walls of the through holes are immersion-plated with zinc or a zinc alloy.

Examples of an immersion plating liquid include a mixed solution of 120 g/l of sodium hydroxide, 20 g/l of zinc oxide, 2 g/l of crystalline ferric chloride, 50 g/l of potassium sodium tartrate, and 1 g/l of sodium nitrate, and the like.

In addition, commercially available Zn or Zn alloy plating liquid may be used, and, for example, SUB STAR Zn-1, Zn-2, Zn-3, Zn-8, Zn-10, Zn-111, Zn-222, Zn-291, and the like, all manufactured by Okuno Chemical Industries Co., Ltd., can be used.

The immersion duration of the aluminum substrate in the above-described immersion plating liquid is preferably in a range of 15 seconds to 40 seconds, and the immersion temperature is preferably in a range of 20° C. to 50° C.

<Plating Treatment>

In a case in which a zinc coating is formed by immersion-plating the surfaces of the aluminum substrate with zinc or an zinc alloy by means of the above-described substitution treatment, it is preferable to carry out, for example, a plating treatment in which the zinc coating is substituted with nickel by means of electroless plating described below and then a variety of metals are precipitated by means of electrolytic plating described blow.

(Electroless Plating Treatment)

As a nickel plating liquid that is used in an electroless plating treatment, it is possible to use a broad range of commercially available products, and examples thereof include an aqueous solution including 30 g/l of nickel sulfate, 20 g/l of sodium phosphinate, and 50 g/l of ammonium citrate, and the like.

In addition, examples of a nickel alloy plating liquid include Ni—P alloy plating liquids in which a phosphorus compound serves as a reducing agent, Ni—B plating, liquids in which a boron compound serves as a reducing agent, and the like.

The immersion duration in the above-described nickel plating liquid or nickel alloy plating liquid is preferably in a range of 15 seconds to 10 minutes, and the immersion temperature is preferably in a range of 30° C. to 90° C.

(Electrolytic Plating Treatment)

In a case in which, for example, electroplating of Cu is carried out as an electrolytic plating treatment, a plating liquid is, for example, a plating liquid obtained by adding 60 to 110 g/L of copper sulfate, 160 to 200 g/L of sulfuric acid, and 0.1 to 0.15 mL/L of hydrochloric acid to pure water and further adding 1.5 to 5.0 mL/L of TOP LUCINA SF base WR, 0.5 to 2.0 mL/L of TOP LUCINA SF-B, and 3.0 to 10 mL/L of TOP LUCINA SF leveller, all manufactured by Okuno Chemical Industries Co., Ltd., thereto as additives.

The immersion duration in the above-described copper plating liquid is not particularly limited since the immersion duration is dependent on the thickness of a Cu film, and, in a case in which, for example, a 2 μm-thick Cu film is formed, the aluminum substrate is preferably immersed in the plating liquid for approximately five minutes at a current density of 2 A/dm$^2$, and the immersion temperature is preferably in a range of 20° C. to 30° C.

[Water Washing Treatment]

In the present invention, it is preferable to carry out water washing after the completion of the steps of the respective treatments described above. In the water washing, it is possible to use pure water, well water, tap water, or the like. In order to prevent the treatment liquids from being carried to the subsequent steps, a nipping device may be used.

EXAMPLES

Hereinafter, the present invention will be described in more detail on the basis of examples. Materials, amounts used, percentages, treatment contents, treatment orders, and the like described in the following examples can be appropriately modified within the scope of the gist of the present invention. Therefore, the scope of the present invention should not be interpreted in a limited manner by the examples described below.

Example 1

<Production of Aluminum Plate for Collector>

A treatment which will be described below was carried out on the surface of an aluminum substrate having an average thickness of 20 μm and a size of 200 mm×300 mm (JIS H-4160, alloy number: 1N30-H, aluminum purity: 99.30%), thereby producing an aluminum plate for a collector.

(a1) Aluminum Hydroxide Coating-Forming Treatment (Coating-Forming Step)

An electrolytic treatment was carried out under a condition of the sum of the quantities of electricity being 1,000 C/dm$^2$ using an electrolytic solution (nitric acid concentration: 1%, sulfuric acid concentration: 0.2%, aluminum concentration: 0.5%) which was held at 50° C. and the above-described aluminum substrate as a cathode, thereby forming an aluminum hydroxide coating on the aluminum substrate. Meanwhile, the electrolytic treatment was carried out using a direct-current power supply. The current density was set to 50 A/dm$^2$.

After the formation of the aluminum hydroxide coating, the aluminum hydroxide coating was washed with water by means of spraying.

(b1) Electrolytic Dissolution Treatment (Through Hole-Forming Step)

Next, an electrolytic treatment was carried out under a condition of the sum of the quantities of electricity being 1,000 C/dm$^2$ using an electrolytic solution (nitric acid concentration: 1%, sulfuric acid concentration: 0.2%, aluminum concentration: 0.5%) which was held at 50° C. and the aluminum substrate as an anode, and through holes were formed in the aluminum substrate and the aluminum hydroxide coating. Meanwhile, the electrolytic treatment was carried out using direct-current power source waves. The current density was set to 25 A/dm$^2$.

After the formation of the through holes, the aluminum substrate and the aluminum hydroxide coating were washed with water by means of spraying and were dried.

(c1) Aluminum Hydroxide Coating-Removing Treatment (Coating-Removing Step)

Next, the aluminum substrate that had been subjected to the electrolytic dissolution treatment was immersed in an aqueous solution (liquid temperature: 35° C.) having an aluminum hydroxide concentration of 5% by mass and an aluminum ion concentration of 0.5% by mass for 30 seconds and was then immersed in an aqueous solution (liquid temperature: 50° C.) having a sulfuric acid concentration of 30% and an aluminum ion concentration of 0.5% by mass for 20 seconds, thereby dissolving and removing the aluminum hydroxide coating.

After that, the aluminum substrate was washed with water by means of spraying and was dried, thereby producing an aluminum plate having the through holes.

Example 2

An aluminum substrate was produced in the same manner as in Example 1 except for the fact that an electrolytic dissolution treatment described in the following section (b2) was carried out instead of the electrolytic dissolution treatment described in the section (b1).

(b2) Electrolytic Dissolution Treatment

The conditions were set in the same manner as in the electrolytic dissolution treatment described in the section (b1) except for the fact that the current density was changed to 10 A/dm$^2$ and the sum of the quantities of electricity was changed to 400 C/dm$^2$.

Example 3

An aluminum plate was produced in the same manner as in Example 1 except for the fact that an aluminum hydroxide coating-forming treatment described in the following section (a2) was carried out instead of the aluminum hydroxide coating-forming treatment described in the section (a1) and an electrolytic dissolution treatment described in the section (b2) was carried out instead of the electrolytic dissolution treatment described in the section (b1).

(a2) Aluminum Hydroxide Coating-Forming Treatment

The conditions were set in the same manner as in the aluminum hydroxide-forming treatment described in the section (a1) except for the fact that the current density was changed to 15 A/dm$^2$ and the sum of the quantities of electricity was changed to 500 C/dm$^2$.

Example 4

An aluminum substrate was produced in the same manner as in Example 1 except for the fact that an electrolytic dissolution treatment described in the following section (b3) was carried out instead of the electrolytic dissolution treatment described in the section (b1).

(b3) Electrolytic Dissolution Treatment

The conditions were set in the same manner as in the electrolytic dissolution treatment described in the section (b1) except for the fact that the current density was changed to 25 A/dm$^2$ and the sum of the quantities of electricity was changed to 100 C/dm$^2$.

Example 5

An aluminum substrate was produced in the same manner as in Example 1 except for the fact that an electrolytic dissolution treatment described in the following section (b4) was carried out instead of the electrolytic dissolution treatment described in the section (b1).

(b4) Electrolytic Dissolution Treatment

The conditions were set in the same manner as in the electrolytic dissolution treatment described in the section (b1) except for the fact that the current density was changed to 25 A/dm$^2$ and the sum of the quantities of electricity was changed to 800 C/dm$^2$.

Example 6

An aluminum substrate was produced in the same manner as in Example 1 except for the fact that an electrolytic dissolution treatment described in the following section (b5) was carried out instead of the electrolytic dissolution treatment described in the section (b1).

(b5) Electrolytic Dissolution Treatment

The conditions were set in the same manner as in the electrolytic dissolution treatment described in the section (b1) except for the fact that the current density was changed to 5 A/dm$^2$ and the sum of the quantities of electricity was changed to 1,000 C/dm$^2$.

Example 7

An aluminum substrate was produced in the same manner as in Example 1 except for the fact that an electrolytic dissolution treatment described in the following section (b6) was carried out instead of the electrolytic dissolution treatment described in the section (b1).

(b6) Electrolytic Dissolution Treatment

The conditions were set in the same manner as in the electrolytic dissolution treatment described in the section (b1) except for the fact that the current density was changed to 30 A/dm$^2$ and the sum of the quantities of electricity was changed to 400 C/dm$^2$.

Comparative Example 1

A negative-type resist film (manufactured by Shinwa Ind. Co., Ltd., EF-100) was uniformly applied onto the same aluminum substrate as in Example 1 to a thickness of 10 µm using a bar coater and was dried at 80° C. for ten minutes. Subsequently, a 0.25 mm×0.25 mm negative film mask (150 µm) having two holes having a diameter of 0.1 mm was prepared. This negative film mask was adhered to one surface of the aluminum substrate on which the resist was laminated in a vacuum and was irradiated with 300 mJ/cm$^2$ ultraviolet rays from an ultraviolet stepper provided a certain distance away from the negative film mask, thereby forming a latent image on a resist layer. On the other hand, the surface other than the surface on which the negative film mask was adhered to in a vacuum was wholly exposed to 300 mJ/cm$^2$ ultraviolet rays without any negative film masks interposed therebetween. Subsequently, non-exposed places were developed using an aqueous solution of 1% sodium carbonate under conditions of one minute/30° C. so as to be removed.

Subsequently, the aluminum surface which began to peel after the development was removed by means of etching. Specifically, a shower treatment was carried out at a pressure of 0.15 MPa for one minute using an aqueous solution (liquid temperature: 40° C.) of 2.2 mol/dm$^3$ of FeCl$_3$ and 1.0 mol/cm$^3$ of HCl. After that, the aluminum surface was immediately washed with water and dried. Subsequently, the cured resist was peeled off and removed. After that, immediately, a shower treatment was carried out for one minute under a condition of 0.15 MPa using an aqueous solution (liquid temperature: 40° C.) of 3% sodium hydroxide. After that, water washing and drying were carried out, thereby producing an aluminum plate.

Comparative Example 2

A direct current was caused to flow at a current density of 25 A/dm² for four seconds in a state in which an aluminum substrate (JIS 1099-0, aluminum purity: 99.99%) having an average thickness of 20 μm and a size of 200 mm×300 mm was immersed in a hydrochloric acid solution having a concentration of 5% at a temperature of 75° C., thereby producing an aluminum plate for a collector.

Comparative Example 3

An aluminum plate was produced in the same manner as in Comparative Example 1 except for the fact that a shower treatment was carried out at a pressure of 0.15 MPa for 40 seconds using an aqueous solution (liquid temperature: 40° C.) of 2.2 mol/dm³ of $FeCl_3$ and 1.0 mol/cm³ of HCl as the shower treatment for removing the aluminum surface by means of etching.

Comparative Example 4

An aluminum plate was produced in the same manner as in Comparative Example 1 except for the fact that a shower treatment was carried out at a pressure of 0.15 MPa for 20 seconds using an aqueous solution (liquid temperature: 40° C.) of 2.2 mol/dm³ of $FeCl_3$ and 1.0 mol/cm³ of HCl as the shower treatment for removing the aluminum surface by means of etching.

Comparative Example 5

An aluminum plate was produced in the same manner as in Comparative Example 1 except for the fact that a B surface of the aluminum plate was used and a shower treatment was carried out at a pressure of 0.15 MPa for 20 seconds using an aqueous solution (liquid temperature: 40° C.) of 2.2 mol/dm³ of $FeCl_3$ and 1.0 mol/cm³ of HCl as the shower treatment for removing the aluminum surface by means of etching.

Comparative Example 6

Holes having a diameter of 150 μm were formed by means of punching in an aluminum substrate having an average thickness of 50 μm and a size of 200 mm×300 mm (JIS H-4160, alloy number: 1N30-H, aluminum purity: 99.30%), thereby producing an aluminum plate having through holes.

The average opening diameters of the through holes in the produced aluminum plates, the cross-sectional shapes (the maximum diameters Ra, the minimum diameters Rb, and the angles $\theta_1$ and $\theta_2$) of the through holes, the percentages of the through holes A, and the average opening diameters, densities, and minimum pitches of the recess portions were measured using the following methods.

The average opening diameter of the through holes was obtained by capturing an image of the surface of the aluminum plate using a high-resolution scanning electron microscope (SEM) at a magnification of 200 times, extracting at least 20 through holes having a circumference that continues in a ring shape from the obtained SEM image, scanning the opening diameters, and computing the average value thereof.

Regarding the maximum diameters Ra, the minimum diameters Rb, and the angles $\theta_1$ and $\theta_2$ of the through holes, a cross section was formed by cutting the through hole using a microtome, an image of this cross section was captured using a high-resolution scanning electron microscope (SEM) at a magnification of 800 times, 10 through holes A having a shape in which the maximum diameter was formed inside were extracted, and the maximum diameter Ra, the minimum diameter Rb, and the angles $\theta_1$ and $\theta_2$ formed between the inner wall surface of the through hole A and the main surface of the aluminum plate were respectively measured.

In addition, the percentage of the through holes A with respect to all through holes was obtained by computing the percentage of the number of the through holes A with respect to all through holes in ten 5 mm×5 mm-ranged places by means of the same measurement as the measurement of the average opening diameter and the measurement of the shape of the through hole.

The average opening diameter of the recess portions was obtained by capturing an image of the surface of the aluminum plate from right above using a high-resolution scanning electron microscope (SEM) at a magnification of 2,000 times, extracting at least 30 recess portions from the obtained SEM image, scanning the opening diameters, and computing the average value thereof.

In addition, the density of the recess portions was obtained by capturing ten SEM images at a magnification of 2,000 times, counting the number of the recess portions so as to compute the number density, and computing the average value of the ten images.

In addition, the minimum pitch of the recess portion was obtained by capturing ten SEM images at a magnification of 2,000 times, measuring distances at which adjacent recess portions were closest to each other, and computing the average value of the ten images.

The measurement results of the average opening diameters of the through holes in the respective aluminum plates, the cross-sectional shapes (the maximum diameters Ra, the minimum diameters Rb, and the angles $\theta_1$ and $\theta_2$) of the through holes, the percentages of the through holes A, and the average opening diameters, densities, and minimum pitches of the recess portions are shown in Table 1.

Meanwhile, the through holes in the aluminum plates of Comparative Examples 1 and 3 to 5 were through holes having a shape that expanded in one direction and the maximum diameter Ra on one main surface side. In addition, the through holes in the aluminum plate of Comparative Example 6 had a straight pipe shape.

[Evaluation]

<Coating Properties>

Active material layers were Rimmed on both surfaces of the produced aluminum plates, and the coating properties were evaluated on the basis of the presence or absence of unevenness on the surfaces of the active material layers.

First, a slurry was prepared by adding and dispersing active charcoal powder (100 parts by mass) having a specific surface area of 1,950 m²/g as an active material, acetylene black (10 parts by mass), an acrylic binder (7 parts by mass), and carboxymethyl cellulose (4 parts by mass) to and in water.

Next, the prepared slurry was applied onto both surfaces of an aluminum plate in which through holes were formed using a die coater so as to obtain a total thickness of 200 μm and was dried at 120° C. for 30 minutes, thereby forming an active material layer on the surface of the aluminum plate.

Whether or not unevenness was seen on the surface of the formed active material layer was visually evaluated, and a case in which unevenness having a diameter of 40 μm or greater was invisible was evaluated to be A, a case in which unevenness having a diameter in a range of 40 to 100 μm was visible was evaluated to be B, and a case in which unevenness having a diameter of 100 μm or greater was visible was evaluated to be C.

<Adhesiveness>

After an active material layer was formed on the surface of the aluminum plate, a part of the active material layer was sampled, and a peeling test was carried out using the specified tape on the basis of JIS Z 1522:2009. A case in which the active material peeled off from the aluminum plate was not attached to the tape was evaluated to be A, a case in which the attachment of the active material peeled off from the aluminum plate was observed in part of the tape was evaluated to be B, and a case in which the attachment of the active material peeled off from the aluminum plate was observed in the entire surface of the tape was evaluated to be C.

The evaluation results are shown in Table 1.

EXPLANATION OF REFERENCES

1: aluminum substrate
2: aluminum hydroxide coating
3: aluminum substrate having through holes
4: aluminum hydroxide coating having through holes
5: through hole
6: first metal layer
7: second metal layer
10: aluminum plate
30: electrode
32: active material layer

What is claimed is:

1. An aluminum plate having a plurality of through holes that penetrate in a thickness direction, comprising:
through holes A which have an average opening diameter of the through holes of 0.1 μm or more and less than

TABLE 1

| | Through hole | | | | | | | Recess portion | | | | |
|---|---|---|---|---|---|---|---|---|---|---|---|---|
| | Average opening diameter μm | Through hole A | | | | | | Average opening diameter μm | Density recess portions/mm² | Minimum pitch μm | Evaluation | |
| | | Maximum diameter Ra μm | Minimum diameter Rb μm | Rb/Ra | θ₁° | θ₂° | Percent-age % | | | | Coating properties | Adhe-siveness |
| Example 1 | 46 | 50 | 46 | 0.92 | 80 | 75 | 82 | 2 | 110000 | 1.1 | B | A |
| Example 2 | 7 | 21 | 7 | 0.33 | 39 | 45 | 85 | 2 | 100000 | 0.9 | A | A |
| Example 3 | 8 | 25 | 8 | 0.32 | 36 | 47 | 91 | 1 | 80000 | 11 | A | B |
| Example 4 | 0.2 | 0.5 | 0.2 | 0.4 | 83 | 84 | 93 | 6 | 90000 | 0.1 | A | A |
| Example 5 | 20 | 38 | 20 | 0.53 | 52 | 63 | 73 | 10 | 7000 | 2.3 | A | A |
| Example 6 | 95 | 142 | 95 | 0.67 | 44 | 36 | 62 | 19 | 1000 | 4.6 | B | A |
| Example 7 | 3.5 | 8.9 | 3.5 | 0.39 | 82 | 78 | 84 | 0.1 | 6000 | 20 | A | B |
| Comparative Example 1 | 10 | 350 | 10 | 0.03 | 23 | 159 | 81 | 2 | 110000 | 1 | C | C |
| Comparative Example 2 | 0.05 | 0.11 | 0.05 | 0.46 | 81 | 83 | 89 | 3 | 210000 | 0.7 | B | C |
| Comparative Example 3 | 121 | 143 | 121 | 0.85 | 76 | 74 | 59 | 1 | 70000 | 11 | C | B |
| Comparative Example 4 | 48 | 59 | 48 | 0.81 | 96 | 72 | 73 | 0.8 | 820000 | 0.9 | B | C |
| Comparative Example 5 | 49 | 57 | 49 | 0.86 | 79 | 97 | 78 | 0.5 | 1730000 | 0.5 | B | C |
| Comparative Example 6 | 150 | 150 | 150 | 1 | 90 | 90 | 98 | — | — | — | C | C |

As shown in Table 1, it is found from the comparison between the examples and the comparative examples that, when the average opening diameter of the through holes formed in the aluminum plate is set to 0.1 μm or more and less than 100 μm, and the through holes A having a shape in which the maximum diameter Ra is formed inside and the maximum diameter Ra and a minimum diameter Rb satisfy 1>Rb/Ra≥0.1, the coating properties of the active material layer improve, and thus the uniformity of the surface improves, and the adhesiveness to active material layers can be improved.

In addition, it is found from the comparison between Examples 1 and 6 and Examples 2 to 5 and 7 that, when the average opening diameter is set to 40 μm or less, the coating properties further improve.

In addition, it is found from Examples 3 and 7 that, when the minimum pitch of the recess portion is set to 10 μm or less, the adhesiveness further improves.

According to what has been described above, the effects of the present invention are clear.

100 μm and have a shape in which a maximum diameter Ra is formed inside and the maximum diameter Ra and a minimum diameter Rb satisfy 0.7≥Rb/Ra≥0.2.

2. The aluminum plate according to claim 1,
wherein an angle formed between a main surface of the aluminum plate and an inner wall surface of the through hole A is less than 90°.

3. The aluminum plate according to claim 1,
wherein the angle formed between the main surface of the aluminum plate and the inner wall surface of the through hole A is 5° to 85°.

4. The aluminum plate according to claim 1,
wherein the through hole A has the minimum diameter Rb on the main surface of the aluminum plate.

5. The aluminum plate according to claim 3,
wherein the through hole A has the minimum diameter Rb on the main surface of the aluminum plate.

6. The aluminum plate according to claim 1,
wherein a diameter of the through hole A gradually increases from the main surface of the aluminum plate toward the inside.

7. The aluminum plate according to claim 5,
wherein a diameter of the through hole A gradually increases from the main surface of the aluminum plate toward the inside.

8. The aluminum plate according to claim 1,
wherein a percentage of the through holes A with respect to all through holes is 30% or more.

9. The aluminum plate according to claim 7,
wherein a percentage of the through holes A with respect to all through holes is 30% or more.

10. The aluminum plate according to claim 1,
wherein a thickness of the aluminum plate is 5 µm to 100 µm.

11. The aluminum plate according to claim 9,
wherein a thickness of the aluminum plate is 5 µm to 100 µm.

12. The aluminum plate according to claim 1, further comprising:
recess portions which have an average opening diameter of 0.1 µm to 100 µm and do not penetrate on the main surface of the aluminum plate.

13. The aluminum plate according to claim 11, further comprising:
recess portions which have an average opening diameter of 0.1 µm to 100 µm and do not penetrate on the main surface of the aluminum plate.

14. The aluminum plate according to claim 12,
wherein a density of the recess portions is 1,000 to 500,000 recess portions/mm².

15. The aluminum plate according to claim 13,
wherein a density of the recess portions is 1,000 to 500,000 recess portions/mm².

16. The aluminum plate according to claim 12,
wherein a minimum pitch between the recess portions is 0.01 µm to 10 µm.

17. A method for manufacturing an the aluminum plate according to claim 1, comprising:

a coating-forming step of forming an aluminum hydroxide coating including aluminum hydroxide as a main component on a front surface of an aluminum substrate;
a through hole-forming step of forming through holes by carrying out a through hole-forming treatment after the coating-forming step; and
a coating-removing step of removing the aluminum hydroxide coating after the through hole-forming step.

18. The method for manufacturing an aluminum plate according to claim 17,
wherein, in the coating-forming step, the aluminum hydroxide coating is formed by carrying out an electrochemical treatment using nitric acid, hydrochloric acid, sulfuric acid, phosphoric acid, oxalic acid, or a mixed acid of two or more thereof.

19. The method for manufacturing an aluminum plate according to claim 17,
wherein, in the through hole-forming step, the through holes are formed by carrying out an electrochemical dissolution treatment using nitric acid, hydrochloric acid, sulfuric acid, phosphoric acid, oxalic acid, or a mixed acid of two or more thereof.

20. The method for manufacturing an aluminum plate according to claim 17,
wherein, in the coating-removing step, the aluminum hydroxide coating is removed by carrying out a chemical dissolution treatment using nitric acid, hydrochloric acid, sulfuric acid, phosphoric acid, oxalic acid, a mixed acid of two or more thereof, or sodium hydroxide.

21. The aluminum plate according to claim 1,
wherein an aluminum substrate of the aluminum plate is an alloy plate including aluminum as a main component and a small amount of foreign elements.

22. The aluminum plate according to claim 1,
wherein a percentage of the through holes A with respect to all through holes is 30% to 90%.

* * * * *